United States Patent
Li et al.

(10) Patent No.: US 9,940,406 B2
(45) Date of Patent: Apr. 10, 2018

(54) MANAGING DATABASE

(71) Applicant: International Business Machines Corporation, Armonk, NY (US)

(72) Inventors: Li Li, Beijing (CN); Liang Liu, Beijing (CN); Junmei Qu, Beijing (CN); Wen Jun Yin, Beijing (CN); Wei Zhuang, Beijing (CN)

(73) Assignee: International Business Machine Corporation, Armonk, NY (US)

( * ) Notice: Subject to any disclaimer, the term of this patent is extended or adjusted under 35 U.S.C. 154(b) by 370 days.

(21) Appl. No.: 14/670,208

(22) Filed: Mar. 26, 2015

(65) Prior Publication Data
US 2015/0278394 A1  Oct. 1, 2015

(30) Foreign Application Priority Data
Mar. 27, 2014  (CN) .......................... 2014 1 0119830

(51) Int. Cl.
*G06F 17/30* (2006.01)

(52) U.S. Cl.
CPC .. *G06F 17/30917* (2013.01); *G06F 17/30297* (2013.01); *G06F 17/30315* (2013.01);
(Continued)

(58) Field of Classification Search
CPC ......... G06F 17/30917; G06F 17/30315; G06F 17/30297; G06F 17/30548; G06F 17/30353; G06F 17/30486
(Continued)

(56) References Cited

U.S. PATENT DOCUMENTS 6,587,854 B1 *  7/2003 Guthrie ............. G06F 17/30471
7,103,590 B1 *  9/2006 Murthy ............. G06F 17/30483
(Continued)

FOREIGN PATENT DOCUMENTS

| CN | 102521406 A | 6/2012 |
| CN | 102426609 B | 2/2013 |
| CN | 103116610 A | 5/2013 |

OTHER PUBLICATIONS

Chang et al., "Bigtable: A Distributed Storage System for Structured Data", In Proceedings of the 7th Conference on USENIX Symposium on Operating Systems Design and Implementation, vol. 7, pp. 205-218 (14 pages), 2006.*
(Continued)

*Primary Examiner* — Phuong Thao Cao
(74) *Attorney, Agent, or Firm* — Scully, Scott, Murphy & Presser, P.C.; David M. Quinn, Esq.

(57) ABSTRACT

The present invention discloses a method and system for managing a database. According to embodiments of the present invention, there is provided a method for managing a database, each item of data in the database being associated with a timestamp and a data point, the timestamps being used as row keys for rows of a table in the database, the method comprising: obtaining a behavior characteristic of a user based on a previous data access to the database by the user; partitioning columns in the table into column families based on the obtained behavior characteristic and system configuration of the database; and causing data in the database to be stored in respective column families at least in part based on the associated data point. There is further disclosed a corresponding system.

13 Claims, 3 Drawing Sheets

(52) U.S. Cl.
CPC .. *G06F 17/30353* (2013.01); *G06F 17/30486* (2013.01); *G06F 17/30548* (2013.01)

(58) Field of Classification Search
USPC .......................................................... 707/803
See application file for complete search history.

(56) References Cited

U.S. PATENT DOCUMENTS

| | | | |
|---|---|---|---|
| 7,548,928 B1* | 6/2009 | Dean | G06F 17/30985 |
| 7,567,973 B1* | 7/2009 | Burrows | G06F 17/30312 |
| 7,949,687 B1* | 5/2011 | Sinclair | G06F 17/30312 |
| | | | 707/758 |
| 8,635,251 B1* | 1/2014 | Chan | G06F 17/3089 |
| | | | 707/667 |
| 8,886,647 B2* | 11/2014 | Uppala | G06F 17/30445 |
| | | | 707/737 |
| 9,141,651 B1* | 9/2015 | Rus | G06F 17/30315 |
| 9,210,053 B2* | 12/2015 | Chen | H04L 43/022 |
| 2006/0129691 A1* | 6/2006 | Coffee | H04L 67/04 |
| | | | 709/230 |
| 2006/0253473 A1* | 11/2006 | Agrawal | G06F 17/30584 |
| 2007/0033354 A1* | 2/2007 | Burrows | G06F 17/30212 |
| | | | 711/156 |
| 2007/0143259 A1* | 6/2007 | Uppala | G06F 17/30486 |
| 2008/0059492 A1* | 3/2008 | Tarin | G06F 17/30315 |
| 2008/0313246 A1* | 12/2008 | Shankar | G06F 17/30339 |
| 2009/0119346 A1* | 5/2009 | Lu | G06F 17/30578 |
| 2010/0057572 A1* | 3/2010 | Scheibe | G06Q 30/02 |
| | | | 705/14.61 |
| 2010/0114976 A1* | 5/2010 | Castellanos | G06F 17/30312 |
| | | | 707/803 |
| 2011/0004921 A1* | 1/2011 | Homer | G06F 21/31 |
| | | | 726/3 |
| 2011/0119371 A1* | 5/2011 | Toshima | G06F 21/552 |
| | | | 709/224 |
| 2011/0153650 A1* | 6/2011 | Lee | G06F 17/30067 |
| | | | 707/769 |
| 2011/0167421 A1 | 7/2011 | Soundararajan et al. | |
| 2011/0321175 A1* | 12/2011 | Slater | G06F 21/552 |
| | | | 726/28 |
| 2012/0109892 A1* | 5/2012 | Novik | G06F 17/30566 |
| | | | 707/633 |
| 2012/0155152 A1* | 6/2012 | Uemura | G11C 11/412 |
| | | | 365/156 |
| 2012/0158723 A1* | 6/2012 | Wu | G06F 17/30545 |
| | | | 707/737 |
| 2012/0166402 A1* | 6/2012 | Pederson | G06F 17/30312 |
| | | | 707/692 |
| 2012/0271860 A1* | 10/2012 | Graham, Jr. | G06Q 30/02 |
| | | | 707/798 |
| 2012/0331564 A1* | 12/2012 | Enoki | G06F 21/6254 |
| | | | 726/27 |
| 2013/0124578 A1* | 5/2013 | Vangati | G06F 17/30315 |
| | | | 707/803 |
| 2013/0132371 A1 | 5/2013 | Bharath et al. | |
| 2014/0081918 A1* | 3/2014 | Srivas | G06F 17/3007 |
| | | | 707/639 |
| 2014/0188820 A1* | 7/2014 | Pederson | G06F 17/30584 |
| | | | 707/693 |
| 2014/0258296 A1* | 9/2014 | Chen | H04L 43/022 |
| | | | 707/737 |
| 2014/0279855 A1* | 9/2014 | Tan | G06F 17/30345 |
| | | | 707/609 |
| 2014/0280766 A1* | 9/2014 | Banerjee | H04L 65/60 |
| | | | 709/219 |
| 2014/0372871 A1* | 12/2014 | Song | G06F 17/30893 |
| | | | 715/234 |
| 2015/0088813 A1* | 3/2015 | Lahiri | G06F 17/30292 |
| | | | 707/609 |
| 2015/0213071 A1* | 7/2015 | Alvey | G06F 17/30315 |
| | | | 707/803 |
| 2015/0213072 A1* | 7/2015 | Chen | G06F 17/30315 |
| | | | 707/693 |
| 2015/0220080 A1* | 8/2015 | Nixon | G05B 19/418 |
| | | | 700/19 |
| 2015/0286681 A1* | 10/2015 | Baer | G06F 17/30486 |
| | | | 707/754 |
| 2016/0203166 A1* | 7/2016 | Aron | G06F 17/30578 |
| | | | 707/609 |

OTHER PUBLICATIONS

TimeStored—What is a Column-Oriented Database—accessed online at <http://www.timestored.com/time-series-data/what-is-a-column-oriented-database> on May 8, 2017, 2 pages.*
Vashishtha, "Enhancing Query Support in HBase Via an Extended Coprocessor Framework," Thesis, University of Alberta, Fall 2001.
Zhou et al., "Optimized Data Placement for Column-Oriented Data Store in the Distributed Environment," 16th International Conference, DASFAA 2011, International Workshops, Apr. 22-25, 2011.
List of IBM Patents or Patent Applications Treated as Related.

* cited by examiner

MANAGING DATABASE

FIELD

Embodiments of the present invention generally relate to data storage technology, and more specifically, to a method and system for managing a database.

BACKGROUND

Time series data refer to a series of data collected with time. In general, time series data may be acquired from a plurality of data monitoring points (shortly referred to as "data points") based on a predetermined time interval. Therefore, time series data are associated with both time information and data points. A typical example of time series data is meter data in power grid. These data are measured by meters distributed within a given geographical area (e.g., street, community, city, etc.) and periodically stored in a central database such as an electric power company.

Compared with other types of data, the time series data increase very fast. Each data point will continuously produce data with time, such that the total amount of data to be stored will increase dramatically. Additionally, since the time series data are associated with the data point and time, information on the data point and the time are both required for the access to such data. Due to these properties, the traditional relational database would not be suitable for storing time series data. For example, due to the ACID (atomicity, consistency, isolation, durability) requirements of the relational database, a large scale of time series data would cause concurrent issues (e.g., dead lock), frequent SQL operations (e.g., thousands of times per second), and other problems. Therefore, the relational database cannot satisfy the needs in practice in terms of query performance.

A column-oriented database has been proposed to store time series data. For example, Hadoop database (referred to as "HBase") is a known column-oriented database, which will be discussed hereinafter as an example. In the HBase, columns in a data table are classified into column families. Each column family may include one or more columns. When data constantly increases, the size of the data table also increases accordingly. At this point, the data in the data table are partitioned into a plurality of regions to store. Each region may be managed by a corresponding object called "HRegion." In the underlying Hadoop distributed file system (HDFS), the data in each region is stored in one or more blocks in a corresponding data node.

However, as to the time series data, HBase and other known column-oriented databases as well suffer from the deficiencies in data access performance, which will be discussed in detail hereinafter. Therefore, there is a need in the art for a solution for managing storage of time series data to support more efficient and effective access to such data.

SUMMARY

With regard to the time series data, rows of a table are generally associated with time dimensions. In other words, the data obtained within the same period of time (e.g., the same day, the same month, etc.) are stored in one row of the data table. In this way, time information may serve as a row key to locate the row where the data to be accessed is located. Information on the data point of time series data may be used to retrieve a column In other words, data associated with the same data point are stored in sequence in one column of a given column family. The inventors have found that when a query focuses on the same row or a few numbers of rows, such column-oriented database may provide a better data access performance. However, when a user's query spans across more rows, the data access performance will significantly degrades.

In order to solve the above and other potential problems, the present invention provides a solution for managing storage of time series data.

According to one aspect of the present invention, there is provided a method for managing a database, each item of data in the database being associated with a timestamp and a data point, the timestamps being used as row keys for rows of a table in the database, the method comprising: obtaining a behavior characteristic of a user based on a previous data access to the database by the user; partitioning columns in the table into column families based on the obtained behavior characteristic and system configuration of the database; and causing data in the database to be stored in respective column families at least in part based on the associated data point.

In another aspect of the present invention, there is provided a system for managing a database, each item of data in the database being associated with a timestamp and a data point, the timestamps being used as row keys for rows of a table in the database, the method comprising: a behavior characteristic obtaining unit configured to obtain a behavior characteristic of a user based on a previous data access to the database by the user; a column family partitioning unit configured to partition columns in the table into column families based on the obtained behavior characteristic and system configuration of the database; and a data storage managing unit configured to cause data in the database to be stored in respective column families at least in part based on the associated data point.

It would be understood through the following description that, different from the prior art, according to embodiments of the present invention, the regular behavior characteristics exhibited by the user when accessing the time series data are obtained and used to configure the storage structure of the database. Specifically, the number of columns contained in a column family of a data table may be flexibly configured based on the user's time behavior characteristic and the specific configuration of the database. In this way, cross-block operations in data access can be effectively avoided, so as to significantly improve the performance of data access. Other features and advantages of the present invention will become more understandable through the following description.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals are used to represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
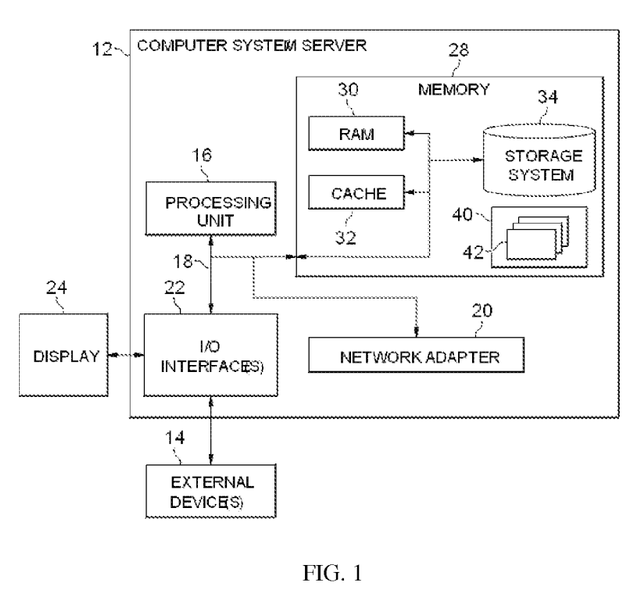
FIG. 1 shows an exemplary computer system which is applicable to implement embodiments of the present invention.

Referring now to FIG. 1, in which an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present invention will be described in detail hereinafter. One of the core ideas of the plurality of exemplary embodiments of the present invention is: summing behavior characteristics when a user accesses time series data, to configure a table (particularly, a column family) in a database so as to enhance the data access performance. These inventors notice that for time series data, a user's access generally involves a particular period of time (e.g., one month, one year, etc.). Therefore, by configuring a table in a database according to such time characteristics and system configuration of the database, cross-block data operations in data access can be effectively reduced or even avoided. Besides, optionally, cross-region data access operations can also be reduced or event avoided.

In particular, in the context of the present disclosure, the term "row" and 'column' may be used in exchange. Specifically, for a table of a database, any of its dimensions (transverse horizontal or longitudinal dimension) may be defined as a row, while the other dimension may be defined as a column Although the horizontal dimension of the database is described as row and the longitudinal dimension is described as column in the following description, it is only exemplary. In other words, row may be defined in the longitudinal dimension of the table, while column is defined in the horizontal dimension.

Figure 2:
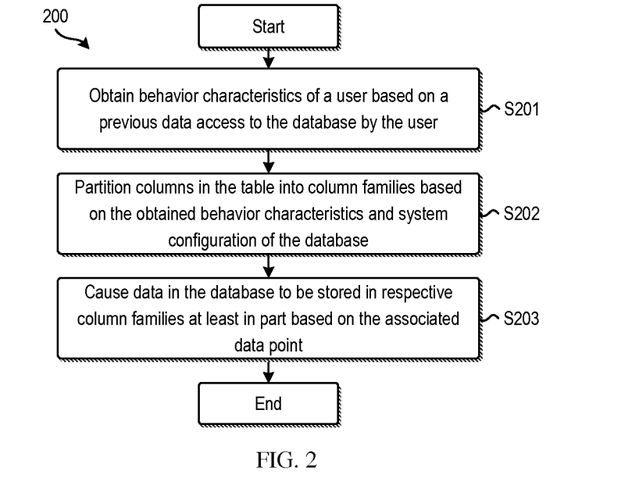
FIG. 2 shows a schematic flowchart of a method for managing a database according to embodiments of the present invention.

FIG. 2 shows a flowchart of a method 200 for managing a database according to embodiments of the present invention. According to embodiments of the present invention, the target database on which the method 200 is applied is a column-oriented database, such as the HBase. Moreover, the data to be stored are time series data. In other words, each item of data is associated with a timestamp and a data point. For example, the timestamp may indicate the time when data are acquired or manipulated, and the data point may indicate the source of the data (e.g., meter for collecting electricity consumption). As known, when a column-oriented database is used to store and access time series data, the time information of the data may be used as row keys, i.e., index for rows of tables in the database.

As shown, method 200 is entered at step S201, where behavior characteristics of a user are acquired based on previous data access to the database by the user. According to embodiments of the present invention, it is possible to record the behaviors of one or more users when they access time series data in the database. Then an appropriate data analysis approach may be applied to extract regular behaviors.

For example, in some embodiments, the behavior characteristic may include time span of the previous data access. As an example, if it is found through statistics that a user usually accesses data within a time window of one month, one year, or any other suitable length, the length of such time window may be determined as the time span. The time span reflects the user's time characteristics when accessing the time series data and thus may be used to configure the database, which will be detailed below.

Alternatively or additionally, statistics may be made on data types that are often accessed by the user. Accordingly, the size of data that is usually accessed by the user may be derived. For example, if it is found through statistics that a user always accesses electric data within a designated region in a year, the electric data may be determined as the data type that are usually accessed. Moreover, since the data structure of electric data is known, the size of each data may be calculated based on the determined data type.

Please note that the above examples are only for the purpose of illustration, without suggesting any limitations on the scope of the invention. According to embodiments of the present invention, any alternative or additional behavior characteristics of the user may be obtained. The scope of the present invention is not limited in this regard.

Next, the method 200 proceeds to step S202, where columns contained in a table of the database are partitioned into column families based on the behavior characteristics of the user as obtained at step S201 and the system configuration of the database.

In conventional solutions, the number of columns in a column family is determined by the database and can be extended in some circumstances. However, the column families are obtained only depending on the configuration of the database or the data volume as stored. On the contrary, according to embodiments of the present invention, partitioning of column families is performed based on not only the configuration of the database per se, but also the historical behavior characteristics of the user.

For example, in some embodiments, the number of columns contained in each column family may be determined based on the combination of time span of the user's previous data access, a size of each data item, and the configuration of the database (e.g., block size). As such, the data in the same column family may be stored in as less file system blocks as possible. In this way, cross-block operations in data access can be effectively reduced or even eliminated.

Alternatively or additionally, in some embodiments, in order to partition column families, a plurality of logical tables may be generated based on the original database table. The term "logical table" used here is a part of a database table. In other words, one logical table is logically formed by a certain number of rows and a certain number of columns in a physical database table. In such an embodiment, the width (i.e., the number of column families contained) of each logical table may be determined based on system configuration, such that the data in the same logical table are stored in as less regions as possible. In this way, cross-region operations in data access can be reduced or even eliminated.

A plurality of exemplary embodiments at step S202 may be described in detail hereinafter with reference to FIG. 3.

Still with reference to FIG. 2, the method 200 proceeds to step S203, where data in the database are stored in respective column families at least based on the associated data points.

For example, as mentioned above, in a column-oriented database, all data associated with one data point may be stored in one column in the database table. In some embodiments of the present invention, at step S203, data at relevant data point may be stored in different columns for the same column family. Specifically speaking, suppose column I and column II are two columns in the same column family, wherein column I stores time series data associated with data point A. In this event, according to embodiments of the present invention, the data at data point B associated with data point A may be stored in column II.

According to embodiments of the present invention, correlations between data points may be defined in a plurality of manners. For example, in some exemplary embodiments, two data points geographically adjacent may be regarded as correlated. Still take the meter data as an example. It may be regarded that the data points (meters) corresponding to buildings within the same community are correlated. Therefore, the meter data for these buildings may be stored in columns of the same column family.

Alternatively, the correlations between data points, for example, may be determined based on various factors such as administrative division, subordination relationship, etc. For example, an institution has a plurality of branches. Then, it may be regarded that data points corresponding to these branches are correlated; therefore, their data are stored in the same column family, even these branches are not geographically adjacent.

It would be beneficial to store data in a column family based on associated data points. The reason is that when a user accesses time series data, not only the time tends to be regular (such regularity may be indicated by time span, as stated above), so do the data points. It has been found that users always access data within a period of time with respect to some associated data points, e.g., meter data of a community within one month. As will be discussed hereinafter, in some embodiments, the number of blocks in the file system for storing the data within the same column family can be minimized In this way, by storing data at associated data points into the same column family, when a user accesses data at an associated data point, cross-block operations may be effectively reduced or even eliminated.

Further, it should be noted that the operation executed at step S203 not only includes storing new data in the database as required according to embodiments of the present invention, but also include adjusting storage of previous data in the database. Actually, the method 200 and the method 300 that will be described hereinafter may be applied when building a database or applied to the database already put into use, which will be described in detail hereinafter.

Figure 3:
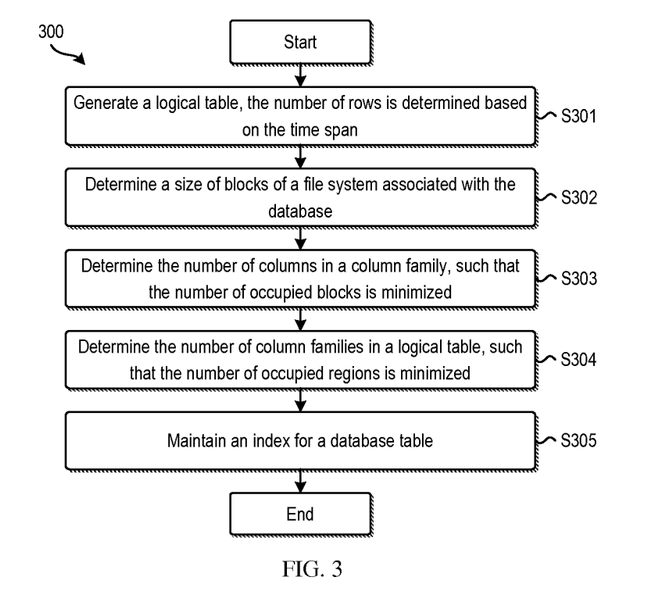
FIG. 3 shows a schematic flowchart of a method for partitioning columns in a database table into column families according to embodiments of the present invention.

Reference is now made to FIG. 3 which shows a flowchart of a method 300 for partitioning columns in a database table into column families according to the exemplary embodiments of the present invention. It may be understood that the method 300 is a specific implementation of step S202 in the method 200 as described above with reference to FIG. 2.

In the embodiment of method 300, the behavior characteristics (obtained at step S201 in method 200) of the user at least include an indication of time span of previous data access. Therefore, at step S301 of method 300, at least one logical table may be generated from the database table based on the time span. As stated above, the logical table is a part of the database table, which logically includes a plurality of rows and columns in the database table.

As described above, according to embodiments of the present invention, time information associated with time series data is used as a row key, for indexing rows in the database table. In other words, what are stored in each row in the table of the database are data at different data points obtained at the same time or within the same period of time. Therefore, it may be determined how many rows in the database table correspond to the time span indicated in the behavior characteristics of the user. By way of example, suppose that the time series data stored in the database are obtained with an interval of one day, and the time span with respect to the previous data access is one week (i.e., 7 days), then the number of rows included in the logical table is 7 rows.

Next, at step S302, block size in a file system associated with the database is determined. It would be appreciated that block is a unit of physical storage of data, and a size of a block is a kind of database configuration information. With an HBase system as an example, it is associated with the bottom layer HDFS system. In implementation, the data in the database table are stored in blocks in the HDFS. The size of block is known. For example, in some embodiments, the block size may be determined and configured by system, e.g., 64M. Alternatively or additionally, the HDFS allows the user to designate or adjust the block size.

The method 300 then proceeds to step S303, where the number of columns contained in each column family is determined at least in part based on the number of rows in the logical table as determined at step S301 and the block size in the file system obtained at step S302. In particular, according to embodiments of the present invention, column families are partitioned such that the number of storage blocks occupied by the data within the same column family is minimized.

Specifically, suppose that the size of each item of data is D, the number of rows of the logical table determined at step S301 is N, and the block a size of the file system determined at step S302 is B. In some embodiments, the number x of the columns contained in each column family may be calculated through resolving the following equation:

$$D*N*x=B$$

According to embodiments of the present invention, ideally, data in each column family may be stored in one block of the file system. If the block size is not enough to contain all data in the column family, the block size may be adjusted or the number of blocks may be incremented. In this way, it can be guaranteed that the data in the column family are stored in as less blocks as possible.

This would be beneficial, because when the user accesses data in the same column family, it can effectively reduce or even eliminate cross-block data access. Besides, as mentioned above, in some embodiments of the present invention, what are stored in the same column family are data at associated data points. In view of the regularity in time and data point when the user accesses time series data (i.e., the user usually accesses data within a period of time with respect to some associated data points), embodiments of the present invention guarantees that for each data access request, it is only necessary to access a minimum number of blocks in the file system. For example, sometimes only one block is involved. In this way, cross-block data access may be effectively reduced or even eliminated, thereby significantly enhancing the access performance to the database and shortening the response time.

Specifically, according to embodiments of the present invention, the size D of each item of data may be predefined, e.g., set by the database system. Alternatively, the size of data item may also be derived based on the obtained behavior characteristics. For example, as stated above, in some embodiments, the behavior characteristics of the user as obtained at step S201 may indicate the data types which were frequency accessed by the user. Therefore, it may be assumed that the user will also access data of this data type in subsequent access. In this way, the size of data item can be determined based on the data type and the data structure of this type of data.

Optionally, in the embodiment where a table is partitioned into a logical table, besides selecting the number of rows (i.e., width of the logical table) contained in the logical table, in some embodiments, the width of the logical table (i.e., the number of column family included in one logical table) may also be determined In such an embodiment, at step S304, based on the size of the region associated with the data table and the block size in the file system as obtained at step S302, the number of column families contained in each logical table is determined.

Specifically, in a column-oriented database, with increase of data, the data in the data table may be partitioned into a plurality of different regions to store, which is known. For example, in HBase, each region of the table is managed by a corresponding HRegion object. Different HRegions may be distributed on the same server or across different servers, for example. It is understood that similar to the cross-block data access, the region-cross data operations can likewise become the performance bottleneck for data access. For example, the cross-region data access always results in operations cross different servers.

In order to solve this problem, according to embodiments of the present invention, at step S304, the number of column families contained in the logical table may be determined such that the number of regions occupied by the data within the logical table can be minimized Specifically, the region a size of the database table may be pre-determined by the database, e.g., 256M. In some cases, the region size may also be designated by the user. Since the region size and block size are both known, it may be determined in how many blocks in the system the data in one region are stored. Suppose one region corresponds to M blocks, M being a natural number (e.g., M=4).

Meanwhile, as mentioned above, when partitioning column families at step S303, the number of blocks occupied by data in each column family has been determined, e.g., denoted as C. Therefore, in some embodiments, the number y of column families included in one logical table may be determined as follows:

$$y=M/C$$

In particular, in an ideal situation (when C=1), columns in each column family are stored in one block. At this point, the number of column families contained in the logical table is exactly equal to M.

It should be noted that step S304 is optional. For example, in some embodiments, the width of the logical table may be equal to the original width of the database table. The scope of the present invention is not limited in this aspect.

Next, the method 300 proceeds to step S305, wherein an index for the database table is maintained. Please note that, the term "maintain" not only comprises creating an index, but also comprises subsequently updating the index. For example, in some embodiments, the index may be implemented separately from the index table of the database table. Each item of data of the index table is for mapping a data point to corresponding logical table and column family. Specifically, in some embodiments, the index table may use the data point ID as the row key. When the user is to access data within a given period of time with respect to one or more specific locations, the data point ID of the target location included in the data access command is used retrieve the index table so as to locate the corresponding index entry. The index entry in turn determined an identifier of the logical table corresponding to the data point and the identification of the column family.

It is noted that the methods 200 and 300 as described above with reference to FIGS. 2 and 3 may be performed upon initial setting of the database. At this point, the database is configured according to the solution proposed according to embodiments of the present invention. In this way, efficient and accurate time series data access may be provided in subsequent use. Alternatively or additionally, the above method may also be dynamically performed in working state after the database is put into use. For example, the obtaining and analysis of user behavior features (step S201) and subsequent operations may be performed simultaneously with database operation. Once the behavior characteristics of the user change, the database may be re-configured correspondingly.

Figure 4:
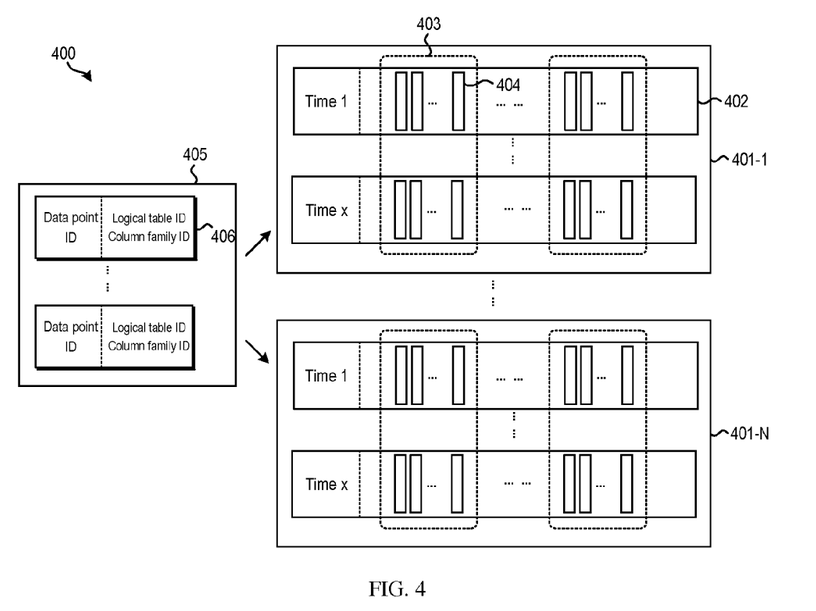
FIG. 4 shows a schematic diagram of database configuration according to embodiments of the present invention.

FIG. 4 shows a block diagram of database configuration 400 according to embodiments of the present invention. In this embodiment, a plurality of logical tables 401-1 to 401-N (collectively referred to as "logical table 401") are generated from the database according to method 300. As described above, the number of rows 402 contained in each logical table 401 may be determined based on the time span of the previous time access as indicated in the behavior characteristics of the user. Moreover, the number of columns 400 contained in the column family 403 may be determined based on the behavior characteristics of the user and system configuration, such that the data in the column family 404 occupies a minimum number of file system blocks. Optionally, the number of column families 403 contained in the logical table 301 may be likewise generated based on system configuration, such that the number of regions occupied by the data in the logical table 401 is minimized.

Moreover, as shown in FIG. 4, an index table 405 independent of the database table is maintained. In the index table, each index entry 406 at least has a "data point ID" filed and a "logical table ID and column family ID" field. When receiving a data access command, the data point ID contained in the command is used as a row key, so as to determine the identification of the logical table 401 storing the data at the data point and the identification of the column family 404. Please note that in the logical table, time information in the data access command is still used as a row key.

Figure 5:
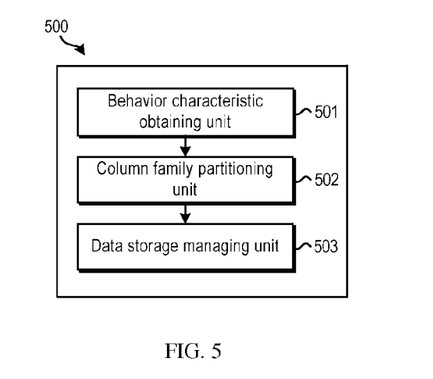
FIG. 5 shows a schematic block diagram of a system for managing a database according to embodiments of the present invention.

FIG. 5 shows a block diagram of a system 500 for managing a database according to embodiments of the present invention. As mentioned above, each item of data in the database is associated with a timestamp and a data point, where the timestamp may be used as a row key of a table in the database.

As shown in the figure, the system 500 comprises: a behavior characteristic obtaining unit 501 configured to obtain, based on previous data access of a user with respect to the database, a behavior characteristic of the user; a column family partitioning unit 502 configured to partition the columns in the table into column families based on the obtained behavior characteristic and system configuration of the database; and a data storage managing unit 503 configured to cause data in the database to be stored in respective column families at least in part based on an associated data point.

In some embodiments, the behavior characteristic indicates time span of the previous data access, and the system configuration indicates a size of a block in a file system associated with the database. In this embodiment, the column partitioning unit 502 may comprise: a logical table generating unit configured to generate at least one logical table from the table, the number of which at least one logical table is determined based on the time span; and a column number determining unit configured to determine the number of columns contained in each column family at least in part based on the number of rows in the at least one logical table and the size of the block, such that the data in the column family occupies a minimum number of the blocks.

Moreover, in some embodiments, the behavior characteristic further indicates a data type of the previous data access. At this point, the number of columns contained in each of the column families is also determined based on the data type. Alternatively or additionally, data in the table of the database may be partitioned into a plurality of regions to store. Correspondingly, the system 500 may also include: a column family number determining unit configured to determine the number of the column families contained in the at least one logical table based on the size of the region and the size of the block, such that the data in the at least one logical table occupy a minimum number of the regions. Alternatively or additionally, the system 500 may also comprise an index table maintaining unit configured to maintain an index for the table in the database, the index mapping identifications of the data points to the at least logical table and the column families.

In some embodiments, the data storage managing unit 503 may be configured to cause the data at the associated data point to be stored in the same column family. Moreover, in some embodiments, the target data base may be HBase.

Please note that for the sake of clarity, FIG. 5 does not show optional units or sub-units included in the system 500. However, it should be understood that all features and operations as described above are applicable to the system 500, respectively, which will not be detailed here. Moreover, the partitioning of units or sub-units in the system 500 is not restrictive, but exemplary, intended to logically describe its main functions or operations. The function of one unit may be implemented through a plurality of units; on the contrary, a plurality of units may be also implemented by one unit. The scope of the present invention is not limited in this aspect.

Moreover, the units included in the system 500 may be implemented in various manners, including software, hardware, firmware or any combination thereof. For example, in some embodiments, the system 500 may be implemented using software and/or firmware. Alternatively or additionally, the system 500 may be implemented partially or completely based on hardware. For example, one or more units in the system 500 may be implemented as an integrated circuit (IC) chip, an application-specific integrated circuit (ASIC), a system on chip (SOC), a field programmable gate array (FPGA), etc. The scope of the present invention is not limited in this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for managing a database, each item of data in the database being associated with a timestamp and a data point, the timestamps being used as row keys for rows of a table in the database, the rows defined on one of two dimensions of the table, the system comprising:
   a hardware processor in communication with said database, said hardware processor configured to perform a method comprising:
   obtaining a behavior characteristic of a user based on a previous data access to the database by the user, said behavior characteristic indicating a time span of the previous data access;
   partitioning columns in the table into column families based on the obtained behavior characteristic and a system configuration of the database, the system configuration indicating a size of blocks in a file system associated with the database, the columns defined on the other of the two dimensions of the table; and
   storing data in the database in respective column families at least in part based on the associated data points.

2. The system according to claim 1,
   wherein the hardware processor is further configured to:
   generate at least one logical table from the table in the database, the number of rows in the at least one logical table determined based on the time span; and
   determine the number of columns included in each of the column families at least in part based on the number of rows in the at least one logical table and the size of the blocks, such that the number of the blocks occupied by data in the column family is minimized.

3. The system according to claim 2, wherein the behavior characteristic further indicates a data type of the previous data access, and wherein the number of columns included in each of the column families is further determined based on the data type.

4. The system according to claim 2, wherein data in the table of the database is partitioned into a plurality of regions to store, the hardware processor being further configured to:
   determine the number of the column families included in the at least one logical table based on a size of a region and the size of the blocks, such that the number of the regions occupied by data in the at least one logical table is minimized.

5. The system according to claim 2, wherein the hardware processor is further configured to:
   maintain an index for the table in the database, the index mapping identifications of the data points to the at least one logical table and the column families.

6. The system according to claim 1, wherein the hardware processor is further configured to cause data for correlated data points to be stored in a same column family.

7. The system according to claim 1, wherein the database is a Hadoop database (HBase).

8. A computer program product for managing a database, each item of data in the database being associated with a timestamp and a data point, the timestamps being used as row keys for rows of a table in the database, the rows defined on one of two dimensions of the table, the computer program product comprising a non-transitory storage medium readable by a processing circuit and storing instructions run by the processing circuit for performing a method, the method comprising:
   obtaining a behavior characteristic of a user based on a previous data access to the database by the user, said behavior characteristic indicating a time span of the previous data access;
   partitioning columns in the table into column families based on the obtained behavior characteristic and a system configuration of the database, the system configuration indicating a size of blocks in a file system associated with the database, the columns defined on the other of the two dimensions of the table; and
   storing data in the database in respective column families at least in part based on the associated data points.

9. The computer program product according to claim 8, wherein the partitioning columns in the table into column families comprises:
   generating at least one logical table from the table, the number of rows in the at least one logical table determined based on the time span; and
   determining the number of columns included in each of the column families at least in part based on the number of rows in the at least one logical table and the size of the blocks, such that the number of the blocks occupied by data in the column family is minimized.

10. The computer program product according to claim 9, wherein the behavior characteristic further indicates a data type of the previous data access, and wherein the number of columns included in each of the column families is further determined based on the data type.

11. The computer program product according to claim 9, wherein data in the table of the database is partitioned into a plurality of regions to store, the method further comprising:
   determining the number of the column families included in the at least one logical table based on a size of a region and the size of the blocks, such that the number of the regions occupied by data in the at least one logical table is minimized.

12. The computer program product according to claim 9, further comprising:
   maintaining an index for the table in the database, the index mapping identifications of the data points to the at least one logical table and the column families.

13. The computer program product according to claim 8, wherein causing data in the database to be stored in respective column families at least in part based on the associated data points comprises:
   causing data for correlated data points to be stored in a same column family.

* * * * *